United States Patent
Guo

(10) Patent No.: US 12,451,951 B2
(45) Date of Patent: Oct. 21, 2025

(54) METHOD AND DEVICE FOR BEAM FAILURE RECOVERY

(71) Applicant: GUANGDONG OPPO MOBILE TELECOMMUNICATIONS CORP., LTD., Guangdong (CN)

(72) Inventor: Li Guo, Allen, TX (US)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 390 days.

(21) Appl. No.: 18/148,107

(22) Filed: Dec. 29, 2022

(65) Prior Publication Data

US 2023/0138282 A1    May 4, 2023

Related U.S. Application Data

(63) Continuation of application No. PCT/CN2021/108491, filed on Jul. 26, 2021.
(Continued)

(51) Int. Cl.
| | | |
|---|---|---|
| H04L 5/00 | (2006.01) | |
| H04B 7/06 | (2006.01) | |
| H04W 24/04 | (2009.01) | |

(52) U.S. Cl.
CPC ..... H04B 7/06964 (2023.05); H04B 7/06968 (2023.05); H04L 5/0051 (2013.01); H04W 24/04 (2013.01)

(58) Field of Classification Search
CPC ... H04B 7/088; H04B 7/0695; H04B 7/06966
See application file for complete search history.

(56) References Cited

U.S. PATENT DOCUMENTS

| | | | | |
|---|---|---|---|---|
| 2020/0119799 A1* | 4/2020 | Jung | .................... | H04W 72/23 |
| 2021/0135818 A1* | 5/2021 | Chen | .................... | H04L 5/0048 |

(Continued)

FOREIGN PATENT DOCUMENTS

| | | |
|---|---|---|
| CN | 111107630 A | 5/2020 |
| CN | 111246499 A | 6/2020 |

(Continued)

OTHER PUBLICATIONS

Search Report for European Application No. 21868274.8 Issued Oct. 27, 2023, 9 Pages.
(Continued)

Primary Examiner — Romani Ohri
(74) Attorney, Agent, or Firm — PERKINS COIE LLP

(57) ABSTRACT

Methods and devices for beam failure recovery are provided. A method for beam failure recovery includes: when a terminal device in a common beam operation mode detects beam failure in a cell, sending, by the terminal device, a beam failure recovery request message to a network device, wherein the beam failure recovery request message includes indication of a selected candidate beam; and after the beam failure recovery request message is received by the network device and before the terminal device receives indication of a transmission configuration indicator (TCI) state for common beam operation from the network device, performing, by the terminal device, physical downlink control channel (PDCCH) reception and physical downlink shared channel (PDSCH) reception on the cell by using same antenna port quasi co-location (QCL) parameters as the ones associated with the selected candidate beam.

20 Claims, 4 Drawing Sheets

Related U.S. Application Data

(60) Provisional application No. 63/078,548, filed on Sep. 15, 2020.

(56) References Cited

U.S. PATENT DOCUMENTS

| | | | | |
|---|---|---|---|---|
| 2022/0039077 A1* | 2/2022 | Koskela | ............... | H04W 72/02 |
| 2022/0225428 A1* | 7/2022 | Xiong | ................... | H04W 72/23 |
| 2023/0319591 A1* | 10/2023 | Zhou | ..................... | H04L 5/0023 370/329 |

FOREIGN PATENT DOCUMENTS

| | | |
|---|---|---|
| WO | 2019137446 A1 | 7/2019 |
| WO | 2020037458 A1 | 2/2020 |
| WO | 2020168238 A1 | 8/2020 |

OTHER PUBLICATIONS

CATT, Discussion on multi-beam operation for NR-PDCCH, 3GPP TSG RAN WG1 NR Ad-Hoc#2 R1-1710078, Qingdao, P.R. China, Jun. 27-30, 2017, 5 pages.

International Search Report Mailed Oct. 26, 2021 In Application No. PCT/CN2021/108491.

Written Opinion Mailed Oct. 26, 2021 In Application No. PCT/CN2021/108491.

3GPP TS 38.211 V16.0.0 (Dec. 2019), 3rd Generation Partnership Project; Technical Specification Group Radio Access Network; NR; Physical channels and modulation, 124 pages.

3GPP TS 38.211 V16.2.0 (Jun. 2020), 3rd Generation Partnership Project; Technical Specification Group Radio Access Network; NR; Physical channels and modulation, 126 pages.

3GPP TS 38.212 V16.0.0 (Dec. 2019), 3rd Generation Partnership Project; Technical Specification Group Radio Access Network; NR; Multiplexing and channel coding, 141 pages.

3GPP TS 38.212 V16.2.0 (Jun. 2020), 3rd Generation Partnership Project; NR; Multiplexing and channel coding, 146 pages.

3GPP TS 38.213 V16.0.0 (Dec. 2019), 3rd Generation Partnership Project; Technical Specification Group Radio Access Network; NR; Physical layer procedures for control, 145 pages.

3GPP TS 38.213 V16.2.0 (Jun. 2020), 3rd Generation Partnership Project; Technical Specification Group Radio Access Network; NR; Physical layer procedures for control, 176 pages.

3GPP TS 38.214 V16.0.0 (Dec. 2019), 3rd Generation Partnership Project; Technical Specification Group Radio Access Network; NR; Physical layer procedures for data, 147 pages.

3GPP TS 38.214 V16.2.0 (Jun. 2020), 3rd Generation Partnership Project; Technical Specification Group Radio Access Network; NR; Physical layer procedures for data, 163 pages.

3GPP TS 38.215 V16.0.0 (Dec. 2019), 3rd Generation Partnership Project; Technical Specification Group Radio Access Network; NR; Physical layer measurements, 21 pages.

3GPP TS 38.321 V16.0.0 (Mar. 2020), 3rd Generation Partnership Project; Technical Specification Group Radio Access Network; NR; Medium Access Control (MAC) protocol specification, 140 pages.

3GPP TS 38.331 V16.0.0 (Mar. 2020), 3rd Generation Partnership Project; Technical Specification Group Radio Access Network; NR; Radio Resource Control (RRC) protocol specification, 832 pages.

* cited by examiner

METHOD AND DEVICE FOR BEAM FAILURE RECOVERY

CROSS-REFERENCE TO RELATED APPLICATION

The present application is a continuation application of International Application PCT/CN2021/108491, filed on Jul. 26, 2021, which claims the priority of U.S. provisional application U.S. 63/078,548, filed on Sep. 15, 2020. The present application claims priority and the benefit of the above-identified applications and the above-identified applications are incorporated by reference herein in their entireties.

TECHNICAL FIELD

The present disclosure relates to the communication field, and more particularly, to methods and devices for beam failure recovery.

BACKGROUND

A New Radio (NR)/5G system generally supports multi-beam operation on downlink and uplink physical channels and reference signals. The use case for supporting multi-beam operation mainly is for deployment of a high-frequency band system, where high-gain analog beamforming is used to combat large path loss.

The 3GPP standards: 3GPP TS 38.211 V16.0.0: "NR; Physical channels and modulation", 3GPP TS 38.212 V16.0.0: "NR; Multiplexing and channel coding", 3GPP TS 38.213 V16.0.0: "NR; Physical layer procedures for control", 3GPP TS 38.214 V16.0.0: "NR; Physical layer procedures for data", 3GPP TS 38.215 V16.0.0: "NR; Physical layer measurements", 3GPP TS 38.321 V16.0.0: "NR; Medium Access Control (MAC) protocol specification", and 3GPP TS 38.331 V16.0.0: "NR; Radio Resource Control (RRC) protocol specification" disclose relevant background technologies.

SUMMARY

Implementations of the present disclosure provide methods and devices for beam failure recovery.

In an aspect, a method for beam failure recovery includes: when a terminal device in a common beam operation mode detects beam failure in a cell, sending, by the terminal device, a beam failure recovery request message to a network device, wherein the beam failure recovery request message includes indication of a selected candidate beam; and after the beam failure recovery request message is received by the network device and before the terminal device receives indication of a transmission configuration indicator (TCI) state for common beam operation from the network device, performing, by the terminal device, physical downlink control channel (PDCCH) reception and physical downlink shared channel (PDSCH) reception on the cell by using same antenna port quasi co-location (QCL) parameters as the ones associated with the selected candidate beam.

In another aspect, a method for beam failure recovery includes: receiving, by a network device, a beam failure recovery request message sent by a terminal device in a common beam operation mode when the terminal device detects beam failure in a cell, wherein the beam failure recovery request message includes indication of a selected candidate beam; and after the network device receives the beam failure recovery request message and before the network device sends indication of a TCI state for common beam operation to the terminal device, performing, by the network device, PDCCH transmission and PDSCH transmission on the cell by using the selected candidate beam.

In yet another aspect, a terminal device includes: a processing module, configured to detect beam failure in a cell; a transmitting module, configured to, when the processing module detects beam failure in the cell under a common beam operation mode of the terminal device, send a beam failure recovery request message to a network device, wherein the beam failure recovery request message includes indication of a selected candidate beam; and a receiving module, configured to, after the beam failure recovery request message is received by the network device and before receiving indication of a TCI state for common beam operation from the network device, perform PDCCH reception and PDSCH reception on the cell by using same antenna port QCL parameters as the ones associated with the selected candidate beam.

In yet another aspect, a network device includes: a receiving module, configured to receive a beam failure recovery request message sent by a terminal device in a common beam operation mode when the terminal device detects beam failure in a cell, wherein the beam failure recovery request message includes indication of a selected candidate beam; and a transmitting module, configured to, after the receiving module receives the beam failure recovery request message and before sending indication of a TCI state for common beam operation to the terminal device, perform PDCCH transmission and PDSCH transmission on the cell by using the selected candidate beam.

A better understanding of the nature and advantages of implementations of the present disclosure may be gained with reference to the following detailed description and the accompanying drawings.

DETAILED DESCRIPTION

Figure 1:
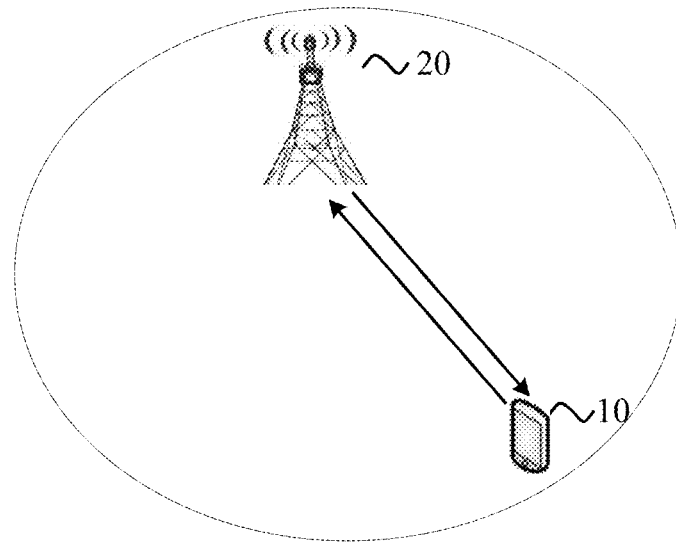
FIG. 1 is a schematic diagram of an exemplary application scenario where an implementation of the present disclosure may be applied.

The technical solutions of exemplary implementations of the present disclosure will be described below with reference to the accompanying drawings. It should be understood that the exemplary implementations are intended for better understanding of the technical solutions of the present disclosure, rather than limiting the scope of the application, and skilled artisans would understand that the exemplary implementations and features disclosed herein can be combined according to actual needs.

The acts shown in the flowchart of the accompanying drawings may be implemented at least in part by a computer system storing a set of computer-executable instructions. In addition, although a logical sequence is shown in the flowchart, in some cases the acts shown or described may be performed in a different sequence, or some acts may be not performed at all.

The technical solutions of the implementations of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a long term evolution (LTE) system, a LTE Frequency Division Duplex (FDD) system, a LTE Time Division Duplex (TDD) system, a Universal Mobile Telecommunication System (UMTS) system, a Worldwide Interoperability for Microwave Access (WiMAX) communication system, a New Radio (NR) system or fifth-generation (5G) system, or a future communication system.

A terminal device in implementations of the present disclosure may refer to user equipment (UE), an access terminal, a subscriber unit, a subscriber station, a mobile station, a rover station, a remote station, a remote terminal, a mobile device, a user terminal, a terminal, a wireless communication device, a user agent, or a user device. The access terminal may be a cellular phone, a cordless phone, a session initiation protocol (SIP) phone, a wireless local loop (WLL) station, a personal digital assistant (PDA), a handheld device with a wireless communication function, a computing device or other processing devices connected to a wireless modem, an on-board device, a wearable device, a terminal device in a 5G network, or a terminal device in an evolved public land mobile network (PLMN), etc., which are not restricted in the implementations of the present disclosure.

A network device (e.g., a base station) in implementations of the present disclosure may be a device for communicating with a terminal device, and the network device may be a Base Transceiver Station (BTS) in the GSM or CDMA system, a NodeB (NB) in the WCDMA system, an evolved base station (eNB or eNodeB) in the LTE system, or a wireless controller in a Cloud Radio Access Network (CRAN) scenario, or the network device may be a relay station, an access point, an on-board device, a wearable device, a network device (e.g., gNB) in a 5G network, or a network device in an evolved PLMN, etc., which are not restricted in the implementations of the present disclosure.

FIG. 1 shows a schematic diagram of an exemplary application scenario where an implementation of the present disclosure may be applied. A communication system shown in FIG. 1 may include a terminal device 10 and a network device 20. The network device 20 is configured to provide a communication service for the terminal device 10 and is connected to a core network (not shown). The terminal device 10 accesses the network by searching for a synchronization signal, or a broadcast signal, etc., transmitted by the network device 20 to communicate with the network. Arrows shown in FIG. 1 may indicate uplink/downlink transmission through cellular links between the terminal device 10 and the network device 20.

In some exemplary implementations of the present disclosure, a terminal device is described as a UE as an example, but skilled artisans should understand that the terminal device in the present disclosure is not limited to the UE, but can also be other types of terminal device as mentioned above.

NR release 15/16 supports the function of indicating a beam used for a channel such as a physical downlink control channel (PDCCH), a physical downlink shared channel (PDSCH), a physical uplink control channel (PUCCH), or a physical uplink shared channel (PUSCH), or a reference signal such as a channel state information reference signal (CSI-RS) or a sounding reference signal (SRS), through the framework of TCI-state for downlink transmission or spatial relation for uplink transmission.

For PDCCH and PDSCH, a UE may be configured with M TCI-states in higher layer signaling as candidate quasi co-location (QCL) configurations. For each control resource set (CORESET) for PDCCH transmission, the UE can be configured with one or more TCI-states semi-statically and if more than one TCI-state is configured, one MAC control element (CE) command is used to activate one of those TCI-states as the active transmit (Tx) beam for PDCCH transmission. For PDSCH, one MAC CE activation command can activate up to 8 TCI-states and each TCI-state is mapped to one codepoint in the downlink control information (DCI) scheduling PDSCH transmission. Then for each individual PDSCH transmission, the network (NW) can dynamically indicate one of those up to 8 TCI-states through the scheduling DCI.

The system can also use a single MAC CE to update/indicate TCI state(s) for PDCCH and PDSCH in multiple component carriers (CCs) simultaneously. Using a single MAC CE message to update TCI state(s) for PDCCH and PDSCH in multiple different CCs can reduce the overhead of control signaling. Particularly, the system can configure a list of cells for simultaneous TCI state for PDCCH and PDSCH. The system can send one MAC CE indicating one TCI state identity (Id) and one CORESET index, and the UE may apply the antenna port quasi co-location provided by the indicated TCI state to the CORESET with the indicated index of all the configured cells in the configured list. For PDSCH transmission, the system can send one MAC CE message that activates up to 8 TCI state Ids for PDSCH transmission and the UE may apply the indicated TCI state Ids on the PDSCH transmission in all the configured cells in the configured list. There are two special cases for determining the TCI state for a PDSCH transmission.

If a DCI does not contain a TCI field and the time offset between the PDSCH and the scheduling DCI is equal or greater than a threshold timeDurationForQCL, the TCI state applied to the CORESET used for the PDCCH transmission scheduling the PDSCH may be applied to the PDSCH transmission.

If a DCI does not contain a TCI field and the time offset between the PDSCH and the scheduling DCI is less than the threshold timeDurationForQCL, the UE would apply a 'default' TCI state on the PDSCH reception and the 'default' TCI state is the TCI state or QCL assumption of the CORESET with lowest controlResourceSetId in the latest slot in which one or more CORESETs within the active bandwidth part (BWP) of a serving cell are monitored by the UE.

The Tx beam information for CSI-RS transmission is indicated through a TCI-state configured or indicated to a CSI-RS resource. For a periodic CSI-RS resource, the TCI-state is configured in RRC signaling semi-statically. For a semi-persistent CSI-RS resource, the TCI-state can be configured in RRC signaling semi-statically or indicated in the MAC CE message that activates the transmission of semi-persistent CSI-RS. For an aperiodic CSI-RS resource, the TCI-state is configured to the CSI-RS resource in the configuration of aperiodic CSI-RS trigger state in RRC signaling. Then the gNB can use physical layer signaling to dynamically trigger the transmission of aperiodic CSI-RS transmission and also dynamically indicate the Tx beam information.

For SRS transmission, a UE Tx beam is configured or indicated through spatial relation info. For periodic SRS transmission, the spatial relation info is configured per SRS resource in RRC signaling semi-statically. For aperiodic SRS transmission, the spatial relation info can be configured in RRC signaling semi-statically, which is one method and another method is the NW can use one MAC CE to update/indicate spatial relation info for an SRS resource, which thus provide more dynamic spatial relation info updating. For semi-persistent SRS transmission, the spatial relation info can be included in the MAC CE activation command that activates the transmission of semi-persistent SRS resource. To reduce the overhead of MAC CE for indicating spatial relation info for SRS, the system can use a single MAC CE to indicate one spatial relation info for SRS resources in multiple different cells. The UE can be provided with a list of CCs and a MAC CE can be used to indicate spatial relation info for all the SRS resource with a same resource Id in all the CCs included in the configured list.

For PUCCH transmission, a UE Tx beam is configured through PUCCH spatial relation info. The UE is provided with one or more than one PUCCH spatial relation info configuration in RRC signaling semi-statically. Then for each PUCCH resource, the UE can be indicated with one PUCCH spatial relation info through a MAC CE activation command. To reduce the overhead of MAC CE for indicating spatial relation info for PUCCH, the system can use a single MAC CE to indicate one spatial relation info for a group of PUCCH resources.

To reduce the signaling overhead and latency of beam switching, a common beam operation for control and data can be introduced. In the common beam operation mode, a single TCI state can be indicated to provide QCL assumption for all the PDCCH and PDSCH reception and spatial setting for the transmission of all the PUSCH, PUCCH and SRS.

Beam failure recovery function for a primary cell is specified in 3GPP specification, which can be called as link recovery too. To perform beam failure recovery for a primary cell, a UE can be configured with a set of RSs as beam failure detection RS and another set of RSs as new beam identification RS. The UE can first monitor the RS configured as beam failure detection RS and use hypothetical block error ratio (BLER) as metric to detect the beam failure of PDCCH in one active BWP in the primary cell. If the UE detects beam failure and the UE also finds at least one new beam identification RS that has reference signal received power (RSRP) larger than a configured threshold, the UE then transmits a random access channel (RACH) preamble in a given RACH resource occasion which is configured to be associated with the new beam identification RS that is selected by the UE. The transmission of that RACH preamble in a given RACH resource can be considered as a beam failure recovery request to the gNB. If the gNB detects such a RACN preamble successfully, the gNB would use the QCL assumption of the new beam RS indicated by the detected RACH preamble to transmit PDCCH in a search space that is dedicated for beam failure recovery response. After sending the RACH preamble as beam failure recovery request, the UE can begin to monitor PDCCH in the dedicated search space and if valid PDCCH is detected, the UE can assume the gNB receives the beam failure request successfully.

The current beam failure recovery design is based on the beam indication framework where beam TCI state or spatial relation is separately indicated for each PDCCH, PDSCH, PUSCH, PUCCH and SRS. However, in a system configured with common beam operation, a common TCI state is applied to all the control and data transmission. The operation of beam failure recovery function in such a system is not efficient. And the UE behavior on receiving downlink (DL) channels and signals and transmitting uplink channels and signals specified in the current beam failure recovery design contradicts with the design of common beam operation in some aspects.

The present disclosure provides methods and devices for beam failure recovery, which is especially applicable to a scenario where common beam operation is carried out.

Figure 2:
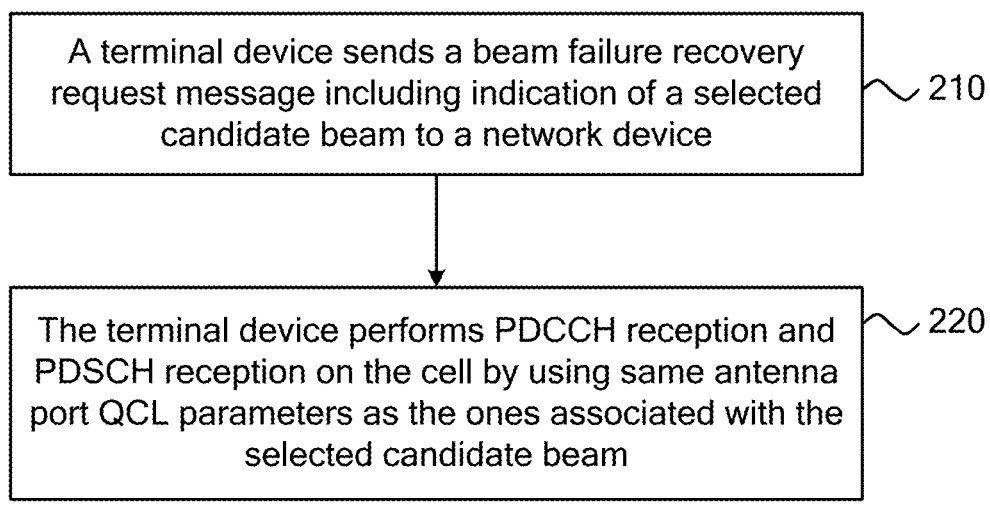
FIG. 2 is a schematic diagram of a method for beam failure recovery according to an implementation of the present disclosure.

FIG. 2 is a schematic diagram of a method for beam failure recovery according to an implementation of the present disclosure. As shown in FIG. 2, the method includes acts 210 and 220. In act 210, when a terminal device in a common beam operation mode detects beam failure in a cell, the terminal device sends a beam failure recovery request message to a network device, wherein the beam failure recovery request message includes indication of a selected candidate beam. In act 220, after the beam failure recovery request message is received by the network device and before the terminal device receives indication of a TCI state for common beam operation from the network device, the terminal device performs PDCCH reception and PDSCH reception on the cell by using same antenna port QCL parameters as the ones associated with the selected candidate beam.

In an exemplary implementation, the method further includes: the terminal device performs CSI-RS reception on the cell by using the same antenna port QCL parameters as the ones associated with the selected candidate beam.

In an exemplary implementation, the CSI-RS reception includes: reception on a CSI-RS resource configured for CSI acquisition; and/or reception on a CSI-RS resource configured with a parameter for indicating following a TCI state for common beam operation.

In an exemplary implementation, the method further includes: the terminal device performs PUCCH transmission and PUSCH transmission on the cell by using a same spatial filter as the one corresponding to the selected candidate beam.

In an exemplary implementation, the method further includes: the terminal device performs SRS transmission on the cell by using a same spatial filter as the one corresponding to the selected candidate beam.

In an exemplary implementation, the indication of the selected candidate beam includes a CSI-RS resource index or SS/PBCH block index.

In an exemplary implementation, the cell is a primary cell (PCell), a primary secondary cell (PSCell), or a secondary cell (SCell).

In an exemplary implementation, the method further includes: the terminal device performs PUCCH transmission and PUSCH transmission on a same cell as physical random access channel (PRACH) transmission by using a same spatial filter as that for a last PRACH transmission.

In an exemplary implementation, the method further includes: the terminal device performs SRS transmission on a same cell as PRACH transmission by using a same spatial filter as that for a last PRACH transmission.

In an exemplary implementation, the SRS transmission includes: transmission on an SRS resource used for codebook-based transmission, non-codebook-based transmission or antenna switching; and/or transmission on an SRS resource configured with a parameter for indicating following a TCI state for common beam operation.

In an exemplary implementation, the PDCCH reception includes PDCCH reception in all CORESETs of the terminal device on the cell.

In an exemplary implementation, the method further includes: the terminal device receives, from the network device, configuration of a set 4% of periodic CSI-RS resource configuration index for beam failure detection; wherein the set $\overline{q_0}$ includes at most one periodic CSI-RS resource configuration index.

In an exemplary implementation, the method further includes: when the terminal device is not provided with a set $\overline{q_0}$ of periodic CSI-RS resource configuration index for beam failure detection, the terminal device determines that the set $\overline{q_0}$ includes a periodic CSI-RS resource configuration index with a same value as a reference signal resource index with QCL-TypeD configuration in a TCI state for common beam operation.

In an exemplary implementation, a TCI state for common beam operation is used for providing QCL assumption for downlink reception and/or spatial setting for uplink transmission.

In an exemplary implementation, the downlink reception includes at least one of: PDCCH reception, PDSCH reception, or CSI-RS reception; and the uplink transmission includes at least one of: PUSCH transmission, PUCCH transmission, or SRS transmission.

Illustrative examples related to the above exemplary implementations are described below for better understanding of the technical solution of the present disclosure.

In an example, a UE can be configured with a common beam operation mode. When a UE is configured in a common beam operation mode, the UE can be indicated one TCI state that provides QCL assumption for receiving all the PDCCH and PDSCH in one cell and the UE can be indicated with one TCI state that provides spatial setting for the PUSCH, PUCCH and SRS in one cell. In one example, a UE can be configured with one or more higher layer parameters TCI state and in each TCI state, the UE can be provided with one or more of the following parameters:

One reference signal providing 'QCL-TypeD' quasi co-location type for quasi co-location relationship between one or two downlink reference signals and the demodulation reference signal (DM-RS) ports of PDSCH, the DM-RS port of PDCCH or the CSI-RS port(s) of a CSI-RS resource;

One reference signal providing information for determining a spatial filter for the transmission of PUSCH, PUCCH or an SRS resource;

One reference signal providing both 'QCL-TypeD' for PDSCH, PDCCH or CSI-RS resource and a spatial filter for PUSCH, PUCCH or the SRS resource;

One reference signal providing a path loss reference signal for PUSCH, PUCCH or the SRS resource;

One reference signal providing both 'QCL-TypeD' for PDSCH, PDCCH or CSI-RS resource and a spatial filter and a path loss reference signal for PUSCH, PUCCH or the SRS resource.

When the UE is configured with the common beam operation mode, the system can use a DCI format (or MAC CE) to indicate a first TCI state to the UE and the UE can be requested to perform one or more of following operations:

Receiving all the UE-specific PDCCH and corresponding PDSCH transmission by following the QCL configuration provided by the first TCI state;

Receiving CSI-RS resources in a CSI-RS resource set not configured with the higher layer parameter trs-info and not configured with the higher layer parameter repetition by following the QCL configuration provided by the first TCI state;

Receiving a CSI-RS resource that is configured with a higher layer parameter that indicates the UE may follow the TCI state indicated for common beam operation by following the QCL configuration provided by the first TCI state;

Transmitting PUSCH and PUCCH according to the spatial setting provided by the first TCI state;

Transmitting an SRS resource for codebook or noncodebook or antennaSwitching according to the spatial setting provided by the first TCI state;

Transmitting an SRS resource that is configured with a higher layer parameter that indicates the UE may follow the TCI state indicated for common beam operation according to the spatial setting provided by the first TCI state.

In one example, a UE can be configured with a higher layer parameter commonBeamOperation that is used to configure the UE to operate in the common beam operation mode.

In an example, if a UE is configured in the common beam operation mode for a serving cell, the UE can be configured to operate beam failure recovery in that cell. For each BWP in the serving cell, the UE can be provided with a set $\overline{q_0}$ of periodic CSI-RS resource configuration index for beam failure detection. The number of CSI-RS resource configuration index in the set $\overline{q_0}$ is up to one. If the UE is not provided with $\overline{q_0}$, the UE may determine the set $\overline{q_0}$ to include periodic CSI-RS resource configuration index with the same value as RS index with QCL-TypeD configuration in the TCI state that is indicated by DCI (or MAC CE) for common beam operation. When the UE detects beam failure in a cell, the UE can send beam failure recovery request message to the system. Along with the beam failure recovery request message, an index of a selected candidate beam can be sent to the system. The index of the selected candidate beam can be signaled through a CSI-RS resource index or SS/PBCH block index $q_{new}$. After the beam failure recovery request message is received by the system, the UE can be requested to perform the operations as described below.

For the PCell or PSCell, after X1 (e.g.,28) symbols from a last symbol of a first PDCCH reception in a search space set dedicated for beam failure recovery (for example the search space set provided by recoverySearchSpaceId) for which the UE detects a DCI format with a cyclic redundancy check (CRC) scrambled by a cell radio network temporary identity (C-RNTI) or a modulation coding scheme cell radio network temporary identity (MCS-C-RNTI), and until the UE receives a DCI format (or MAC CE) that indicates one TCI state for common beam operation, the UE can be requested to perform one or more of the following operations.

The UE can be requested to monitor PDCCH in all the UE-specific CORESETs and corresponding PDSCH using the same antenna port quasi co-location parameters as the ones associated with the corresponding index $q_{new}$.

The UE can be requested to receive a CSI-RS configured for CSI acquisition using the same antenna port quasi co-location parameters as the ones associated with the corresponding index $q_{new}$.

The UE can be requested to receive a CSI-RS resource that is configured with a higher layer parameter that indicates the UE may follow the TCI state indicated for common beam operation using the same antenna port quasi co-location parameters as the ones associated with the corresponding index $q_{new}$.

The UE can be requested to transmit PUSCH and PUCCH using the same antenna port quasi co-location parameters as the ones associated with the corresponding index $q_{new}$.

The UE can be requested to transmit an SRS configured for codebook or noncodebook or antennaSwitching using the same antenna port quasi co-location parameters as the ones associated with the corresponding index $q_{new}$.

The UE can be requested to transmit an SRS resource that is configured with a higher layer parameter that indicates the UE may follow the TCI state indicated for common beam operation using the same antenna port quasi co-location parameters as the ones associated with the corresponding index $q_{new}$.

For an SCell, a UE can be provided, by schedulingRequestID-BFR-SCell-r16, a configuration for PUCCH transmission with a link recovery request (LRR). The UE can transmit in a first PUSCH MAC CE providing index(es) for at least corresponding SCell(s) with radio link quality worse than $Q_{out}$,LR, indication(s) of presence of $q_{new}$ for corresponding SCell(s), and index(es) $q_{new}$ for a periodic CSI-RS configuration or for an SS/PBCH block provided by higher layers, as described in 3GPP TS 38.321, if any, for corresponding SCell(s). After 28 symbols from a last symbol of a PDCCH reception with a DCI format scheduling a PUSCH transmission with a same hybrid automatic repeat request (HARQ) process number as for the transmission of the first PUSCH and having a toggled new data indicator (NDI) field value, the UE can be requested to perform one or more of the following operations.

The UE can be requested to monitor PDCCH in all the UE-specific CORESETs and corresponding PDSCH using the same antenna port quasi co-location parameters as the ones associated with the corresponding index $q_{new}$.

The UE can be requested to receive a CSI-RS configured for CSI acquisition using the same antenna port quasi co-location parameters as the ones associated with the corresponding index $q_{new}$.

The UE can be requested to receive a CSI-RS resource that is configured with a higher layer parameter that indicates the UE may follow the TCI state indicated for common beam operation using the same antenna port quasi co-location parameters as the ones associated with the corresponding index $q_{new}$.

The UE can be requested to transmit PUSCH and PUCCH using the same antenna port quasi co-location parameters as the ones associated with the corresponding index $q_{new}$.

The UE can be requested to transmit an SRS configured for codebook or noncodebook or antennaSwitching using the same antenna port quasi co-location parameters as the ones associated with the corresponding index $q_{new}$.

The UE can be requested to transmit an SRS resource that is configured with a higher layer parameter that indicates the UE may follow TCI state indicated for the common beam operation using the same antenna port quasi co-location parameters as the ones associated with the corresponding index $q_{new}$.

In one example, a UE can be provided, for each BWP of a serving cell, a set $\bar{q}_0$ of periodic CSI-RS resource configuration indexes by failureDetectionResources and a set $\bar{q}_0$ of periodic CSI-RS resource configuration indexes and/or SS/PBCH block indexes by candidateBeamRSList or candidateBeamRSListExt-r16 or candidateBeamRSSCellList-r16 for radio link quality measurement on the BWP of the serving cell. If the UE is not provided $\bar{q}_0$ by failureDetectionResources or beamFailureDetectionResourceList for a BWP of the serving cell, the UE determines the set $\bar{q}_0$ to include periodic CSI-RS resource configuration indexes with same values as the RS indexes in the RS sets indicated by TCI-State for respective CORESETs that the UE uses for monitoring PDCCH and, if there are two RS indexes in a TCI state, the set $\bar{q}_0$ includes RS indexes with QCL-TypeD configuration for the corresponding TCI states. The UE expects the set $\bar{q}_0$ to include up to two RS indexes. The UE expects single port RS in the set $q_0$. The UE expects single-port or two-port CSI-RS with frequency density equal to 1 or 3 resource elements (REs) per resource block (RB) in the set $\bar{q}_1$. For a UE configured with the common beam operation mode (for example the UE is configured with the higher layer parameter commonBeamOperation), we can add the following specification.

If the UE is configured with the higher layer parameter commonBeamOperation, and the UE is not provided $\bar{q}_0$ by failureDetectionResources or beamFailureDetectionResourceList for a BWP of the serving cell, the UE determines the set $\bar{q}_0$ to include periodic CSI-RS resource configuration indexes or an SS/PBCH block index with same values as the RS indexes in the RS sets indicated by the TCI state that is indicated for common TCI state operation and if there are two RS indexes in the TCI state, the set $q_0$ includes RS indexes with QCL-TypeD configuration for the corresponding TCI state. If the UE is configured with the higher layer parameter commonBeamOperation, the UE expects the set $\bar{q}_0$ to include up to one RS index.

In one example, for the PCell or the PSCell, after 28 symbols from a last symbol of a first PDCCH reception in a search space set provided by recoverySearchSpaceId for which the UE detects a DCI format with CRC scrambled by C-RNTI or MCS-C-RNTI and until the UE receives an activation command for PUCCH-SpatialRelationInfo or is provided PUCCH-SpatialRelationInfo for PUCCH resource(s), the UE transmits a PUCCH on a same cell as the physical random access channel (PRACH) transmission using a same spatial filter as for the last PRACH transmission and a power determined as described in Clause 7.2.1 of 3GPP TS 38.213 with $q_s=0$, $q_d=q_{new}$, and l=0.

For the PCell or the PSCell, after 28 symbols from a last symbol of a first PDCCH reception in a search space set provided by recoverySearchSpaceId where a UE detects a DCI format with CRC scrambled by C-RNTI or MCS-C-RNTI, the UE assumes same antenna port quasi co-location parameters as the ones associated with index $q_{new}$ for PDCCH monitoring in a CORESET with index 0. For a UE configured with the common beam operation mode (for example the UE is configured with the higher layer parameter commonBeamOperation), we can add the following specification: If a UE is configured with the higher layer parameter commonBeamOperation, for the PCell or the PSCell, after 28 symbols from a last symbol of a first PDCCH reception in a search space set provided by recoverySearchSpaceId for which the UE detects a DCI format with CRC scrambled by C-RNTI or MCS-C-RNTI and until the UE receives a DCI format (or a MAC CE) indicating one TCI state for common TCI state operation, the UE may perform one or more of following operations:

Monitoring PDCCH in all CORESETs and corresponding PDSCH reception on a same cell using the same antenna port quasi co-location parameters as the ones associated with the corresponding index(es) $q_{new}$, if any;

Receiving a CSI-RS resource on a same cell using the same antenna port quasi co-location parameters as the ones associated with the corresponding index(es) $q_{new}$;

Receiving CSI-RS resources in a NZP-CSI-RS-Resource-Set configured without the higher layer parameter trs-Info and without the higher layer parameter repetition on a same cell using the same antenna port quasi co-location parameters as the ones associated with the corresponding index(es) $q_{new}$;

Receiving CSI-RS resources in a NZP-CSI-RS-Resource-Set configured with a higher layer parameter enableCommonBeamOperation (Note: here the higher layer parameter enableCommonBeamOperation is used to indicate that the CSI-RS resources in that set may follow the TCI state indicated for common beam operation) on a same cell using the same antenna port quasi co-location parameters as the ones associated with the corresponding index(es) $q_{new}$;

Transmitting PUCCH on a same cell as the PRACH transmission using a same spatial filter as for the last PRACH transmission and a power determined with $q_u=0$, $q_d=q_{new}$, and $l=0$;

Transmitting PUCCH on a same cell using a same spatial filter as the one corresponding to $q_{new}$ for periodic CSI-RS or SS/PBCH block reception and a power determined with $q_u=0$, $q_d=q_{new}$, and $l=0$;

Transmitting an SRS resource on a same cell as the PRACH transmission using a same spatial filter as for the last PRACH transmission and a power determined with $q_u=0$, $q_d=q_{new}$, and $l=0$;

Transmitting an SRS resource on a same cell using a same spatial filter as the one corresponding to $q_{new}$ for periodic CSI-RS or SS/PBCH block reception and a power determined with $q_u=0$, $q_d=q_{new}$, and $l=0$;

Transmitting PUSCH on a same cell as the PRACH transmission using a same spatial filter as for the last PRACH transmission and a power determined with $q_u=0$, $q_d=q_{new}$, and $l=0$;

Transmitting PUSCH on a same cell using a same spatial filter as the one corresponding to $q_{new}$ for periodic CSI-RS or SS/PBCH block reception and a power determined with $q_u=0$, $q_d=q_{new}$, and $l=0$;

Transmitting SRS resources with the higher layer parameter usage in SRS-ResourceSet set to 'nonCodebook' or 'codebook' or 'antennaSwitching' on a same cell as the PRACH transmission using a same spatial filter as for the last PRACH transmission and a power determined with $q_s=0$, $q_d=q_{new}$, and $l=0$;

Transmitting SRS resources with the higher layer parameter usage in SRS-ResourceSet set to 'nonCodebook' or 'codebook' or 'antennaSwitching' on a same cell using a same spatial filter as the one corresponding to $q_{new}$ for periodic CSI-RS or SS/PBCH block reception and a power determined with $q_u=0$, $q_d=q_{new}$, and $l=0$.

In one example, a UE can be provided, by schedulingRequestID-BFR-SCell-r16, a configuration for PUCCH transmission with a link recovery request (LRR) as described in Clause 9.2.4 of 3GPP TS 38.213. The UE can transmit in a first PUSCH MAC CE providing index(es) for at least corresponding SCell(s) with radio link quality worse than $Q_{out}$, LR, indication(s) of presence of $q_{new}$ for corresponding SCell(s), and index(es) $q_{new}$ for a periodic CSI-RS configuration or for an SS/PBCH block provided by higher layers, as described in 3GPP TS 38.321, if any, for corresponding SCell(s). After 28 symbols from a last symbol of a PDCCH reception with a DCI format scheduling a PUSCH transmission with a same HARQ process number as for the transmission of the first PUSCH and having a toggled NDI field value, the UE monitors PDCCH in all CORESETs on the SCell(s) indicated by the MAC CE using the same antenna port quasi co-location parameters as the ones associated with the corresponding index(es) $q_{new}$, if any, and transmits PUCCH on a PUCCH-SCell using a same spatial domain filter as the one corresponding to $q_{new}$ for periodic CSI-RS or SS/PBCH block reception, as described in Clause 9.2.2 of 3GPP TS 38.213, and using a power determined as described in Clause 7.2.1 of 3GPP TS 38.213 with $q_u=0$, $q_d=q_{new}$, and $l=0$, if the UE is provided PUCCH-SpatialRelationInfo for the PUCCH, a PUCCH with the LRR was either not transmitted or was transmitted on the PCell or the PSCell, and the PUCCH-SCell is included in the SCell(s) indicated by the MAC-CE. Herein, the SCS configuration for the 28 symbols is the smallest of the SCS configurations of the active DL BWP for the PDCCH reception and of the active DL BWP(s) of the at least one SCell. For a UE configured with the common beam operation mode (for example the UE is configured with the higher layer parameter commonBeamOperation), we can add the following specification: If a UE is configured with the higher layer parameter commonBeamOperation, after 28 symbols from a last symbol of a PDCCH reception with a DCI format scheduling a PUSCH transmission with a same HARQ process number as for the transmission of the first PUSCH and having a toggled NDI field value, the UE may perform one or more of following operations:

Monitoring PDCCH in all CORESETs and corresponding PDSCH reception on a same cell using the same antenna port quasi co-location parameters as the ones associated with the corresponding index(es) $q_{new}$, if any;

Receiving a CSI-RS resource on a same cell using the same antenna port quasi co-location parameters as the ones associated with the corresponding index(es) $q_{new}$;

Receiving CSI-RS resources in a NZP-CSI-RS-Resource-Set configured without the higher layer parameter trs-Info and without the higher layer parameter repetition on a same cell using the same antenna port quasi co-location parameters as the ones associated with the corresponding index(es) $q_{new}$;

Receiving CSI-RS resources in a NZP-CSI-RS-Resource-Set configured with the higher layer parameter enableCommonBeamOperation (Note: here the higher layer parameter enableCommonBeamOperation is used to indicate that the CSI-RS resources in that set may follow the TCI state indicated for common beam operation) on a same cell using the same antenna port quasi co-location parameters as the ones associated with the corresponding index(es) $q_{new}$;

Transmitting PUCCH on a same cell as the PRACH transmission using a same spatial filter as for the last PRACH transmission and a power determined with $q_u=0$, $q_d=q_{new}$, and $l=0$;

Transmitting PUCCH on a same cell using a same spatial filter as the one corresponding to $q_{new}$ for periodic CSI-RS or SS/PBCH block reception and a power determined with $q_u=0$, $q_d=q_{new}$, and $l=0$;

Transmitting an SRS resource on a same cell as the PRACH transmission using a same spatial filter as for the last PRACH transmission and a power determined with $q_u=0$, $q_d=q_{new}$, and $l=0$;

Transmitting an SRS resource on a same cell using a same spatial filter as the one corresponding to $q_{new}$ for periodic CSI-RS or SS/PBCH block reception and a power determined with $q_u=0$, $ga=q_{new}$, and $l=0$;

Transmitting PUSCH on a same cell as the PRACH transmission using a same spatial filter as for the last PRACH transmission and a power determined with $q_u=0$, $q_d=q_{new}$, and $l=0$;

Transmitting PUSCH on a same cell using a same spatial filter as the one corresponding to $q_{new}$ for periodic CSI-RS or SS/PBCH block reception and a power determined with $q_u=0$, $q_d=q_{new}$, and $l=0$;

Transmitting SRS resources with the higher layer parameter usage in SRS-ResourceSet set to 'nonCodebook' or 'codebook' or 'antennaSwitching' on a same cell as the PRACH transmission using a same spatial filter as for the last PRACH transmission and a power determined with $q_u=0$, $q_d=q_{new}$, and $l=0$.

Herein, the SCS configuration for the 28 symbols is the smallest of the SCS configurations of the active DL BWP for the PDCCH reception and of the active DL BWP(s) of the at least one SCell.

As can be seen, the present disclosure provides various exemplary implementations for beam failure recovery in a system configured with the common beam operation mode. When a UE is configured in the common beam operation mode, the UE may derive the beam failure detection RS from the QCL-TypeD RS included in the TCI state indicated for the common beam operation. After the beam failure recovery request message with $q_{new}$ is received by the system, the UE may receive PDCCH in all the CORESETs and corresponding PDSCH, CSI-RS for CSI acquisition and CSI-RS resource configured with a higher layer parameter that indicates the UE to follow common beam operation for that CSI-RS, using the QCL parameter associated with the $q_{new}$. After the beam failure recovery request message with $q_{new}$ is received by the system, the UE may transmit PUSCH, PUCCH, SRS for codebook or noncodebook or antennaSwitching and SRS resource configured with a higher layer parameter that indicates the UE to follow common beam operation for that CSI-RS, using a same spatial filter as the one corresponding to the $q_{new}$.

Figure 3:
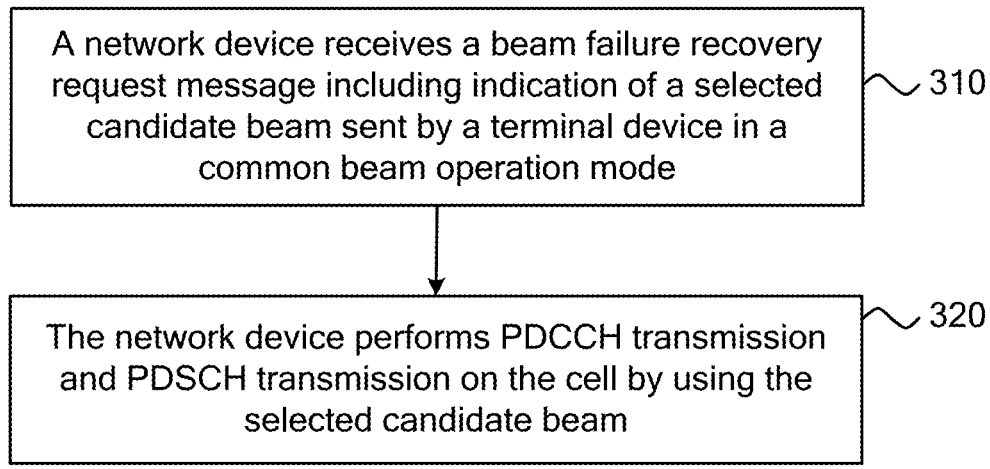
FIG. 3 is a schematic diagram of a method for beam failure recovery according to an implementation of the present disclosure.

FIG. 3 is a schematic diagram of a method for beam failure recovery according to an implementation of the present disclosure. As shown in FIG. 3, the method includes acts 310 and 320. In act 310, a network device receives a beam failure recovery request message sent by a terminal device in a common beam operation mode when the terminal device detects beam failure in a cell, wherein the beam failure recovery request message includes indication of a selected candidate beam. In act 320, after the network device receives the beam failure recovery request message and before the network device sends indication of a TCI state for common beam operation to the terminal device, the network device performs PDCCH transmission and PDSCH transmission on the cell by using the selected candidate beam.

In an exemplary implementation, the method further includes: the network device performs CSI-RS transmission on the cell by using the selected candidate beam.

In an exemplary implementation, the CSI-RS transmission includes: transmission on a CSI-RS resource configured for CSI acquisition; and/or transmission on a CSI-RS resource configured with a parameter for indicating following a TCI state for common beam operation.

In an exemplary implementation, the method further includes: the network device performs PUCCH reception and PUSCH reception on the cell by using a reception beam corresponding to the selected candidate beam.

In an exemplary implementation, the method further includes: the network device performs SRS reception on the cell by using a reception beam corresponding to the selected candidate beam.

In an exemplary implementation, the indication of the selected candidate beam includes a CSI-RS resource index or SS/PBCH block index.

In an exemplary implementation, the cell is a PCell, a PSCell, or a SCell.

In an exemplary implementation, the method further includes: the network device performs PUCCH reception and PUSCH reception on a same cell as PRACH reception by using a same reception beam as that for a last PRACH reception.

In an exemplary implementation, the method further includes: the network device performs SRS reception on a same cell as PRACH reception by using a same reception beam as that for a last PRACH reception.

In an exemplary implementation, the SRS reception includes: reception on an SRS resource used for codebook-based transmission, non-codebook-based transmission or antenna switching; and/or reception on an SRS resource configured with a parameter for indicating following a TCI state for common beam operation.

In an exemplary implementation, the PDCCH transmission includes PDCCH transmission in all CORESETs of the terminal device on the cell.

In an exemplary implementation, the method further includes: the network device configures, for the terminal device, a set q % of periodic CSI-RS resource configuration index for beam failure detection; wherein the set $\overline{q}_0$ includes at most one periodic CSI-RS resource configuration index.

In an exemplary implementation, the method further includes: when a set $\overline{q}_0$ of periodic CSI-RS resource configuration index for beam failure detection is not configured for the terminal device, determining, by the network device, that the set $\overline{q}_0$ includes a periodic CSI-RS resource configuration index with a same value as a reference signal resource index with QCL-TypeD configuration in a TCI state for common beam operation.

In an exemplary implementation, a TCI state for common beam operation is used for providing QCL assumption for downlink reception and/or spatial setting for uplink transmission.

In an exemplary implementation, the downlink reception includes at least one of: PDCCH reception, PDSCH reception, or CSI-RS reception; and the uplink transmission includes at least one of: PUSCH transmission, PUCCH transmission, or SRS transmission.

Herein, it should be understood that the method of FIG. 3 corresponds to the method of FIG. 2, and relevant implementation details and examples of the method of FIG. 3 are similar as those described above for the method of FIG. 2, and will not be repeated here for conciseness of the present disclosure.

Figure 4:
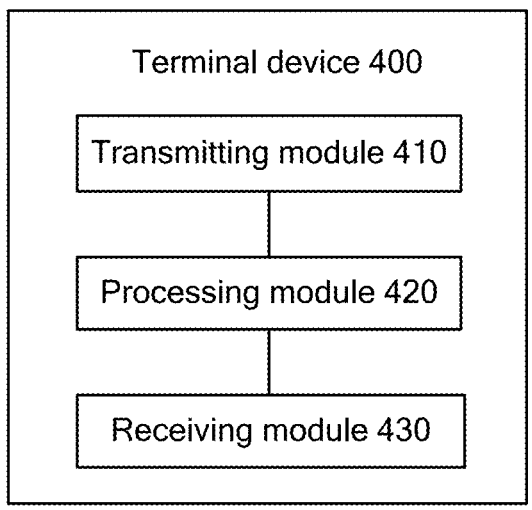
FIG. 4 is a schematic diagram of a terminal device according to an implementation of the present disclosure.

FIG. 4 is a schematic diagram of a terminal device according to an implementation of the present disclosure. As shown in FIG. 4, the terminal device 400 includes a transmitting module 410, a processing module 420, and a receiving module 430. The processing module 420 is configured to detect beam failure in a cell. The transmitting module 410 is configured to, when the processing module 420 detects beam failure in the cell under a common beam operation mode of the terminal device 400, send a beam failure recovery request message to a network device, wherein the beam failure recovery request message includes indication of a selected candidate beam. The receiving module 430 is configured to, after the beam failure recovery request message is received by the network device and before receiving indication of a TCI state for common beam operation from the network device, perform PDCCH reception and PDSCH reception on the cell by using same antenna port QCL parameters as the ones associated with the selected candidate beam.

In an exemplary implementation, the receiving module 430 is further configured to perform CSI-RS reception on the cell by using the same antenna port QCL parameters as the ones associated with the selected candidate beam.

In an exemplary implementation, the CSI-RS reception includes: reception on a CSI-RS resource configured for CSI acquisition; and/or reception on a CSI-RS resource configured with a parameter for indicating following a TCI state for common beam operation.

In an exemplary implementation, the transmitting module 410 is further configured to perform PUCCH transmission and PUSCH transmission on the cell by using a same spatial filter as the one corresponding to the selected candidate beam.

In an exemplary implementation, the transmitting module 410 is further configured to perform SRS transmission on the cell by using a same spatial filter as the one corresponding to the selected candidate beam.

In an exemplary implementation, the indication of the selected candidate beam includes a CSI-RS resource index or SS/PBCH block index.

In an exemplary implementation, the cell is a PCell, a PSCell, or a SCell.

In an exemplary implementation, the transmitting module 410 is further configured to perform PUCCH transmission and PUSCH transmission on a same cell as PRACH transmission by using a same spatial filter as that for a last PRACH transmission.

In an exemplary implementation, the transmitting module 410 is further configured to perform SRS transmission on a same cell as PRACH transmission by using a same spatial filter as that for a last PRACH transmission.

In an exemplary implementation, the SRS transmission includes: transmission on an SRS resource used for codebook-based transmission, non-codebook-based transmission or antenna switching; and/or transmission on an SRS resource configured with a parameter for indicating following a TCI state for common beam operation.

In an exemplary implementation, the PDCCH reception includes PDCCH reception in all CORESETs of the terminal device 400 on the cell.

In an exemplary implementation, the receiving module 430 is further configured to receive, from the network device, configuration of a set $\overline{q_0}$ of periodic CSI-RS resource configuration index for beam failure detection; wherein the set $\overline{q_0}$ includes at most one periodic CSI-RS resource configuration index.

In an exemplary implementation, the processing module 420 is further configured to, when the terminal device 400 is not provided with a set $\overline{q_0}$ of periodic CSI-RS resource configuration index for beam failure detection, determine that the set $\overline{q_0}$ includes a periodic CSI-RS resource configuration index with a same value as a reference signal resource index with QCL-TypeD configuration in a TCI state for common beam operation.

In an exemplary implementation, a TCI state for common beam operation is used for providing QCL assumption for downlink reception and/or spatial setting for uplink transmission.

In an exemplary implementation, the downlink reception includes at least one of: PDCCH reception, PDSCH reception, or CSI-RS reception; and the uplink transmission includes at least one of: PUSCH transmission, PUCCH transmission, or SRS transmission.

It should be understood that the terminal device 400 in the above exemplary implementations can be the terminal device in the various implementations and examples relating to the method of FIG. 2, and the operations and/or functions of the terminal device 400 are respectively for the purpose of implementing corresponding acts of the terminal device in the various method implementations relating to FIG. 2, and accordingly, relevant details and examples can be similar as those described above for the method implementations relating to FIG. 2 and will not be repeated here for conciseness of the present disclosure.

Figure 5:
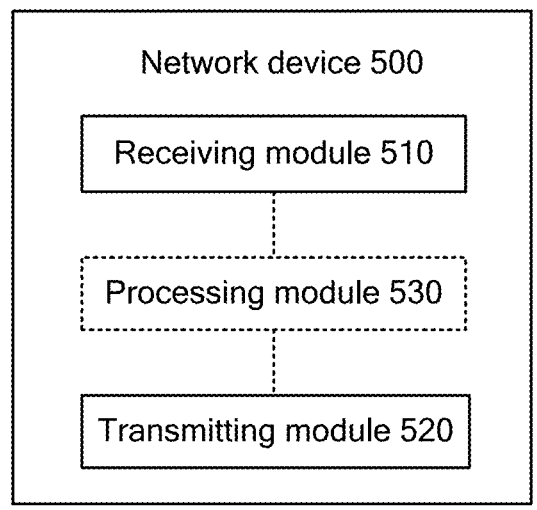
FIG. 5 is a schematic diagram of a network device according to an implementation of the present disclosure.

FIG. 5 is a schematic diagram of a network device according to an implementation of the present disclosure. As shown in FIG. 5, the network device 500 includes a receiving module 510 and a transmitting module 520. The receiving module 510 is configured to receive a beam failure recovery request message sent by a terminal device in a common beam operation mode when the terminal device detects beam failure in a cell, wherein the beam failure recovery request message includes indication of a selected candidate beam. The transmitting module 520 is configured to, after the receiving module 510 receives the beam failure recovery request message and before sending indication of a TCI state for common beam operation to the terminal device, perform PDCCH transmission and PDSCH transmission on the cell by using the selected candidate beam.

In an exemplary implementation, the transmitting module 520 is further configured to perform CSI-RS transmission on the cell by using the selected candidate beam.

In an exemplary implementation, the CSI-RS transmission includes: transmission on a CSI-RS resource configured for CSI acquisition; and/or transmission on a CSI-RS resource configured with a parameter for indicating following a TCI state for common beam operation.

In an exemplary implementation, the receiving module 510 is further configured to perform PUCCH reception and PUSCH reception on the cell by using a reception beam corresponding to the selected candidate beam.

In an exemplary implementation, the receiving module 510 is further configured to perform SRS reception on the cell by using a reception beam corresponding to the selected candidate beam.

In an exemplary implementation, the indication of the selected candidate beam includes a CSI-RS resource index or SS/PBCH block index.

In an exemplary implementation, the cell is a PCell, a PSCell, or a SCell.

In an exemplary implementation, the receiving module 510 is further configured to perform PUCCH reception and PUSCH reception on a same cell as PRACH reception by using a same reception beam as that for a last PRACH reception.

In an exemplary implementation, the receiving module 510 is further configured to perform SRS reception on a same cell as PRACH reception by using a same reception beam as that for a last PRACH reception.

In an exemplary implementation, the SRS reception includes: reception on an SRS resource used for codebook-based transmission, non-codebook-based transmission or antenna switching; and/or reception on an SRS resource configured with a parameter for indicating following a TCI state for common beam operation.

In an exemplary implementation, the PDCCH transmission includes PDCCH transmission in all CORESETs of the terminal device on the cell.

In an exemplary implementation, the transmitting module 520 is further configured to send, to the terminal device, configuration of a set 4% of periodic CSI-RS resource configuration index for beam failure detection; wherein the set $q_0$ includes at most one periodic CSI-RS resource configuration index.

In an exemplary implementation, the network device 500 further includes a processing module 530 configured to, when a set q % of periodic CSI-RS resource configuration index for beam failure detection is not configured for the terminal device, determine that the set $\overline{q_0}$ includes a periodic CSI-RS resource configuration index with a same value as a reference signal resource index with QCL-TypeD configuration in a TCI state for common beam operation.

In an exemplary implementation, a TCI state for common beam operation is used for providing QCL assumption for downlink reception and/or spatial setting for uplink transmission.

In an exemplary implementation, the downlink reception includes at least one of: PDCCH reception, PDSCH reception, or CSI-RS reception; and the uplink transmission includes at least one of: PUSCH transmission, PUCCH transmission, or SRS transmission.

It should be understood that the network device 500 in the above exemplary implementations can be the network device in the various implementations and examples relating to the methods of FIG. 2 and FIG. 3, and the operations and/or functions of the network device 500 are respectively for the purpose of implementing corresponding acts of the network device in the various method implementations relating to FIG. 2 and FIG. 3, and accordingly, relevant details and examples can be similar as those described above for the method implementations relating to FIG. 2 and FIG. 3 and will not be repeated here for conciseness of the present disclosure.

Figure 6:
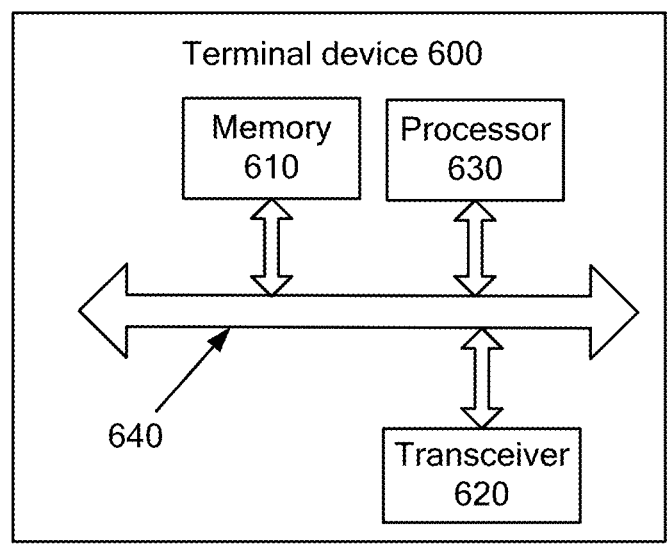
FIG. 6 is a schematic diagram of structure of a terminal device according to an exemplary implementation of the present disclosure.

FIG. 6 shows a schematic diagram of structure of a terminal device 600 according to an exemplary implementation of the present disclosure. As shown in FIG. 6, the terminal device 600 may include a memory 610, a transceiver 620, and a processor 630. The memory 610 may be configured to store data and/or information. The memory 610 may be further configured to store instructions executable by the processor 630, and the processor 630 may be configured to execute the instructions stored in the memory 610 to control the transceiver 620 to receive and/or send signals. Particularly, the transceiver 620 may be configured to implement the functions/operations of the aforementioned transmitting module 410 and receiving module 430. The processor 630 may be configured to implement the functions/operations of the aforementioned processing module 420. Functions/operations of the transmitting module 410, processing module 420, and receiving module 430 are already described in the above and will not be repeated here for conciseness of the present disclosure. The terminal device 600 may further include a bus system 640, which may be configured to connect the components, such as the memory 610, the transceiver 620, and the processor 630, of the terminal device 600.

Herein, it should be understood that the memory 610 may include a read only memory and a random access memory, and may provide instructions and data to the processor 630. A portion of the memory 610 may further include a non-volatile random access memory. For example, the memory 610 may further store device type information and/or other information.

The processor 630 may be a central processing unit (CPU) or other general-purpose processor, a digital signal processor (DSP), an application specific integrated circuit (ASIC), an off-the-shelf programmable gate array (FPGA) or other programmable logic device, a discrete gate or a transistor logic device, or a discrete hardware component, etc. The general-purpose processor may be a microprocessor or any conventional processor.

The bus system 640 may include, in addition to a data bus, a power bus, a control bus, a status signal bus, etc. However, for the sake of clarity, various buses are illustrated as the bus system 640 in FIG. 6.

The various acts of the terminal device in the exemplary implementations relating to the method of FIG. 2 may be implemented by instructions of software or integrated logic circuits of hardware or combination of software and hardware. The software modules may be located in a typical storage medium in the art such as a random access memory, a flash memory, a read-only memory, a programmable read-only memory, an electrically erasable programmable memory, a register, etc. The storage medium may be located in the memory 610, and the processor 630 may read the information in the memory 610 and control the transceiver 620 to send and/or receive signals.

It should be understood that the terminal device 600 can be the terminal device in the various implementations and examples relating to the method of FIG. 2. The terminal device 600 may implement corresponding acts of the terminal device in the various method implementations relating to FIG. 2, and accordingly, relevant details and examples can be similar as those described above for the method implementations relating to FIG. 2 and will not be repeated here for conciseness of the present disclosure.

Figure 7:
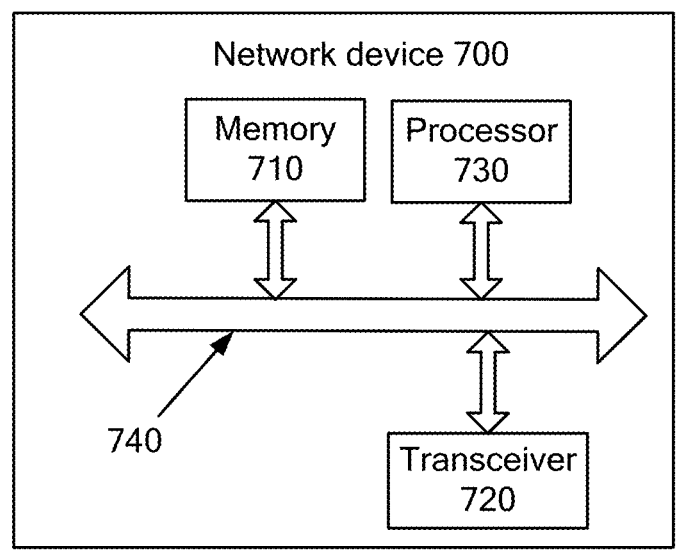
FIG. 7 is a schematic diagram of structure of a network device according to an exemplary implementation of the present disclosure.

FIG. 7 shows a schematic diagram of structure of a network device 700 according to an exemplary implementation of the present disclosure. As shown in FIG. 7, the network device 700 may include a memory 710, a transceiver 720, and a processor 730. The memory 710 may be configured to store instructions executable by the processor 730, and the processor 730 may be configured to execute the instructions stored in the memory 710 to control the transceiver 720 to receive and/or send signals. Particularly, the transceiver 720 may be configured to implement the functions/operations of the aforementioned receiving module 510 and transmitting module 520. The processor 730 may be configured to implement the functions/operations of the aforementioned processing module 530. Functions/operations of the receiving module 510, transmitting module 520 and processing module 530 are already described in the above and will not be repeated here for conciseness of the present disclosure. The network device 700 may further include a bus system 740, which may be configured to connect the components, such as the memory 710, the transceiver 720, and the processor 730, of the network device 700.

Herein, it should be understood that the memory 710 may include a read only memory and a random access memory, and may provide instructions and data to the processor 730. A portion of the memory 710 may further include a non-volatile random access memory. For example, the memory 710 may further store device type information and/or other information.

The processor 730 may be a central processing unit (CPU) or other general-purpose processor, a digital signal processor (DSP), an application specific integrated circuit (ASIC), an off-the-shelf programmable gate array (FPGA) or other programmable logic device, a discrete gate or a transistor logic device, or a discrete hardware component, etc. The general-purpose processor may be a microprocessor or any conventional processor.

The bus system 740 may include, in addition to a data bus, a power bus, a control bus, a status signal bus, etc. However, for the sake of clarity, various buses are illustrated as the bus system 740 in FIG. 7.

The various acts of the network device in the exemplary implementations relating to the methods of FIG. 2 and FIG. 3 may be implemented by instructions of software or integrated logic circuits of hardware or combination of software and hardware. The software modules may be located in a typical storage medium in the art such as a random access memory, a flash memory, a read-only memory, a programmable read-only memory, an electrically erasable programmable memory, a register, etc. The storage medium may be located in the memory 710, and the processor 730 may read the information in the memory 710 and control the transceiver 720 to send and/or receive signals.

It should be understood that the network device 700 can be the network device in the various implementations and examples relating to the methods of FIG. 2 and FIG. 3. The network device 700 may implement corresponding acts of the network device in the various method implementations relating to FIG. 2 and FIG. 3, and accordingly, relevant details and examples can be similar as those described above for the method implementations relating to FIG. 2 and FIG. 3 and will not be repeated here for conciseness of the present disclosure.

Further, a computer readable storage medium is provided in the present disclosure. The computer readable storage medium may store instructions that are executable by a computer or processor to implement any of the aforementioned method for beam failure recovery and/or any exemplary implementation thereof.

It should be understood that in various implementations of the present disclosure, the term "and/or" is used to describe an association relationship between associated objects, indicating that there may be three relationships, for example, a and/or b may indicate three situations: A alone, A and B, and B alone. In addition, the symbol "/" in the present disclosure generally indicates that objects of the former and the latter connected by "/" has an "or" relationship.

Those skilled in the art should understand that the elements and acts in the various implementations disclosed herein may be implemented in electronic hardware, computer software, or a combination of the electronic hardware and the computer software. In order to clearly illustrate the interchangeability of hardware and software, the composition and acts in the implementations have been described in general terms by functions in the above description. Whether these functions are performed in hardware or software depends on the specific application and design constraints of the technical solution. Skilled artisans may use different methods to implement the described functions for each particular application, but such implementation should not be considered to be beyond the scope of the present disclosure.

Those skilled in the art should understand that the specific working processes of the devices and modules described above may correspond to the corresponding processes in the method implementations and may not be repeated for convenience and conciseness of description.

In various implementations of the present disclosure, it should be understood that the disclosed methods and devices may be implemented in other ways. For example, the device implementations described above are merely illustrative, the division of modules is only a logical function division, and there may be other ways of division in actual implementations. For example, multiple modules or components may be combined or integrated into another system, or some features may be ignored or not executed. In addition, the coupling or communication connection between the elements shown or discussed may be a direct coupling or indirect coupling, or communication connection through some interface, device or unit, or may be an electrical, mechanical or other form of connection.

The components described as separate components may be or may be not physically separated, and the component may be or may be not a physical component, i.e., it may be located in one place or may be distributed over multiple network units. Some or all of the components may be selected according to actual needs to achieve the purpose of the implementations of the present disclosure.

The modules may be stored in a computer readable storage medium if they are implemented in the form of software function modules and sold or used as an independent product. Based on such understanding, the technical solutions of the present disclosure may be embodied in the form of a software product, which is stored in a storage medium and includes instructions for causing a computer device (which may be a personal computer, a server, a terminal device, or a network device, etc.) to perform all or part of the acts of the method in various implementations of the present disclosure. The storage media may include a U disk, a mobile hard disk, a read-only memory, a random access memory, a magnetic disk, an optical disk, or other media capable of storing program codes.

What are described above are merely exemplary implementations of the present disclosure. Although the exemplary implementations have been described in considerable detail above, numerous variations and modifications will become apparent to those skilled in the art once the above disclosure is fully appreciated. It is intended that the following claims be interpreted to embrace all such variations and modifications.

What is claimed is:

1. A method for beam failure recovery, comprising:
  when a terminal device in a common beam operation mode detects beam failure in a cell, sending, by the terminal device, a beam failure recovery request message to a network device, wherein the beam failure recovery request message comprises indication of a selected candidate beam; and
  after the beam failure recovery request message is received by the network device and before the terminal device receives indication of a transmission configuration indicator (TCI) state for common beam operation from the network device, performing, by the terminal device, physical downlink control channel (PDCCH) reception and physical downlink shared channel (PDSCH) reception on the cell by using same antenna port quasi co-location (QCL) parameters as the ones associated with the selected candidate beam; wherein the TCI state in the common beam operation mode is indicated to provide QCL assumption for all PDCCH and PDSCH reception and spatial setting for the transmission of all the PUSCH, PUCCH and SRS.

2. The method of claim 1, further comprising:
performing, by the terminal device, channel state information reference signal (CSI-RS) reception on the cell by using the same antenna port QCL parameters as the ones associated with the selected candidate beam.

3. The method of claim 2, wherein the CSI-RS reception comprises:
reception on a CSI-RS resource configured for CSI acquisition; and/or
reception on a CSI-RS resource configured with a parameter for indicating following a TCI state for common beam operation.

4. The method of claim 1, further comprising:
performing, by the terminal device, physical uplink control channel (PUCCH) transmission and physical uplink shared channel (PUSCH) transmission on the cell by using a same spatial filter as the one corresponding to the selected candidate beam.

5. The method of claim 1, further comprising:
performing, by the terminal device, sounding reference signal (SRS) transmission on the cell by using a same spatial filter as the one corresponding to the selected candidate beam.

6. The method of claim 1, wherein the indication of the selected candidate beam comprises a channel state information reference signal (CSI-RS) resource index or synchronization signal/physical broadcast channel (SS/PBCH) block index.

7. The method of claim 1, wherein the cell is a primary cell (PCell), a primary secondary cell (PSCell), or a secondary cell (SCell).

8. The method of claim 1, further comprising:
performing, by the terminal device, physical uplink control channel (PUCCH) transmission and physical uplink shared channel (PUSCH) transmission on a same cell as physical random access channel (PRACH) transmission by using a same spatial filter as that for a last PRACH transmission.

9. The method of claim 1, further comprising:
performing, by the terminal device, sounding reference signal (SRS) transmission on a same cell as physical random access channel (PRACH) transmission by using a same spatial filter as that for a last PRACH transmission.

10. The method of claim 1, wherein the PDCCH reception comprises PDCCH reception in all control resource sets (CORESETs) of the terminal device on the cell.

11. A terminal device, comprising: a processor and a transceiver, wherein
the processor is configured to detect beam failure in a cell;
the transceiver is configured to, when the processor detects beam failure in the cell under a common beam operation mode of the terminal device, send a beam failure recovery request message to a network device, wherein the beam failure recovery request message comprises indication of a selected candidate beam; and
after the beam failure recovery request message is received by the network device and before receiving indication of a transmission configuration indicator (TCI) state for common beam operation from the network device, perform physical downlink control channel (PDCCH) reception and physical downlink shared channel (PDSCH) reception on the cell by using same antenna port quasi co-location (QCL) parameters as the ones associated with the selected candidate beam; wherein the TCI state in the common beam operation mode is indicated to provide QCL assumption for all PDCCH and PDSCH reception and spatial setting for the transmission of all the PUSCH, PUCCH and SRS.

12. The terminal device of claim 11, wherein the transceiver is further configured to perform channel state information reference signal (CSI-RS) reception on the cell by using the same antenna port QCL parameters as the ones associated with the selected candidate beam,
wherein the CSI-RS reception comprises:
reception on a CSI-RS resource configured for CSI acquisition; and/or
reception on a CSI-RS resource configured with a parameter for indicating following a TCI state for common beam operation.

13. The terminal device of claim 11, wherein the transceiver is further configured to perform physical uplink control channel (PUCCH) transmission and physical uplink shared channel (PUSCH) transmission on the cell by using a same spatial filter as the one corresponding to the selected candidate beam.

14. The terminal device of claim 11, wherein the transceiver is further configured to perform sounding reference signal (SRS) transmission on the cell by using a same spatial filter as the one corresponding to the selected candidate beam.

15. The terminal device of claim 11, wherein the indication of the selected candidate beam comprises a channel state information reference signal (CSI-RS) resource index or synchronization signal/physical broadcast channel (SS/PBCH) block index.

16. The terminal device of claim 11, wherein the cell is a primary cell (PCell), a primary secondary cell (PSCell), or a secondary cell (SCell).

17. The terminal device of claim 11, the transceiver is further configured to perform physical uplink control channel (PUCCH) transmission and physical uplink shared channel (PUSCH) transmission on a same cell as physical random access channel (PRACH) transmission by using a same spatial filter as that for a last PRACH transmission.

18. The terminal device of claim 11, the transceiver is further configured to perform sounding reference signal (SRS) transmission on a same cell as physical random access channel (PRACH) transmission by using a same spatial filter as that for a last PRACH transmission.

19. The terminal device of claim 11, wherein the PDCCH reception comprises PDCCH reception in all control resource sets (CORESETs) of the terminal device on the cell.

20. A network device, comprising: a processor and a transceiver, wherein
the transceiver is configured to receive a beam failure recovery request message sent by a terminal device in a common beam operation mode when the terminal device detects beam failure in a cell, wherein the beam failure recovery request message comprises indication of a selected candidate beam; and
after receiving the beam failure recovery request message and before sending indication of a transmission configuration indicator (TCI) state for common beam operation to the terminal device, perform physical downlink control channel (PDCCH) transmission and physical downlink shared channel (PDSCH) transmission on the cell by using the selected candidate beam; wherein the TCI state in the common beam operation mode is indicated to provide QCL assumption for all PDCCH and PDSCH reception and spatial setting for the transmission of all the PUSCH, PUCCH and SRS.

\* \* \* \* \*